United States Patent [19]
Muller

[11] 3,840,761
[45] Oct. 8, 1974

[54] AXIAL AIR GAP, COLLECTOR-LESS D-C MOTOR

[75] Inventor: Rolf Muller, St. Georgen, Germany

[73] Assignee: Papst-Motoren kG, Schwarzwald, Germany

[22] Filed: May 23, 1973

[21] Appl. No.: 363,291

[30] Foreign Application Priority Data

| Date | Country | Number |
|---|---|---|
| May 25, 1972 | Germany | 2225442 |
| Aug. 9, 1972 | Germany | 2239167 |
| Sept. 7, 1972 | Germany | 2243923 |
| Oct. 27, 1972 | Germany | 2252727 |
| Apr. 26, 1973 | Germany | 2321022 |

[52] U.S. Cl. ............ 310/49 R, 310/156, 310/254, 310/268, 318/138, 318/154
[51] Int. Cl. ............................................ H02k 37/00
[58] Field of Search ......... 310/49 R, 156, 268, 254, 310/261, 39; 318/138, 254

[56] References Cited
UNITED STATES PATENTS

| | | | |
|---|---|---|---|
| 3,184,623 | 5/1965 | Marti et al. | 310/156 X |
| 3,456,138 | 7/1969 | Huber | 310/49 R |
| 3,596,119 | 7/1971 | Goldmann | 310/49 R |
| 3,599,050 | 8/1971 | Komatsu | 318/254 X |
| 3,700,942 | 10/1972 | Alth | 310/268 X |

*Primary Examiner*—Mark O. Budd
*Attorney, Agent, or Firm*—Flynn & Frishauf

[57] ABSTRACT

A stator structure, for example an insulating board, has at least one, preferably two or more flat coils located thereon, transverse to the axis of the motor. An axially magnetized, permanent magnet rotor is arranged to rotate in the field generated by the coils. The coils are periodically energized to cause driving torque to be applied to the rotor. To provide for uniformity of torque delivered by the rotor, and for self-starting, ferromagnetic pins, strips, layers or the like are applied to the stator in the gaps between the coils, or coil poles, preferably increasing in magnetic volume over a first angular range of from about 50° to 120°-electrical, and then decreasing over a second range from about 50° to 120°-electrical, to provide additional torque, upon rotation of the rotor, to be imparted thereto during the gaps of energization of the coils.

65 Claims, 23 Drawing Figures

AXIAL AIR GAP, COLLECTOR-LESS D-C MOTOR

Cross reference to related application: U.S. Ser. No. 363,290, filed May 23, 1973.

The present invention relates to a collector-less d-c motor, and more particularly to a motor in which the coil does not have a core, and which is constructed on the principle of an axial air gap, or pancake-type motor.

Collector-less d-c motors have previously been proposed; to control such motors, switching elements are provided, typically semiconductor switches, which periodically energize the coils of the motor armature. Periodic, and particularly pulse-type energization of the armature of the motor causes delivery of driving torque from the motor which is non-uniform with respect to time. Axial air gap-type collector-less d-c motors have also been previously proposed; known motors of this type are not self-starting, however, since commutation is controlled by a voltage which is induced by the rotation of the rotor in the armature coil. The drive torque of such motors has substantial gaps, since the motor is effectively driven during usually less than 50 percent of one rotor revolution. The use of such motors, therefore, has been restricted primarily to drives for clocks and similar uses, where requirements for smoothness of running and uniformity of output torque are not severe. For example, such motors cannot be used in sound reproducing equipment, since the pulsating drive would cause wow or rumble upon reproduction.

It is an object of the present invention to provide an axial air gap motor, preferably of small size, which delivers output torque which is substantially free from torque gaps and has improved uniformity of delivered power, with respect to time; and which, further, is self-starting and is easily adapted to speed control.

SUBJECT MATTER OF THE PRESENT INVENTION

Briefly, ferromagnetic elements are associated with the stator, and placed to be affected by the magnetic field of the rotor and so located that a drive torque is derived therefrom which complements the torque generated by the electric drive, that is, by energization of the armature, and which fills the gaps arising in energization of the armature.

A motor of this type is self-starting and, when properly constructed with due regard to the geometric configuration of the ferromagnetic elements, typically soft iron elements or the like, provides essentially uniform output torque of predetermined design value. It is therefore particularly useful for applications in which a substantially constant output torque, within design limits and not subject to excessive overloads, is desired, for example for fans, ventilators, audio equipment such as record changers, turntables, tape recorders; printing equipment, electric typewriters and the like.

Collector-less d-c motors which are self-starting and have an essentially constant output torque have previously been proposed (see for example 37 Siemens-Zeitschrift" 1966, pages 690–693). The motor requires four separately controlled windings which are separately energized under control of two Hall generators, each one switched by a separate power transistor.

According to an embodiment of the present invention, a control circuit is provided requiring only two power transistors, one Hall generator, and a single, center-tapped winding, thus substantially improving the economy of manufacture of a control for the motor and the construction of the motor itself. Speed control is relatively simple; a control circuit, in accordance with a further aspect of the invention, applies current to the windings at the time when the voltages induced in the windings by the permanent magnet rotor have their maximum, that is, when stator and rotor poles are offset with respect to each other by about 90°-electrical (hereinafter: °-el.). Good efficiency and uniformity of output speed and torque are provided when the current in the windings is applied generally at the period of time when maximum voltages are induced in the windings by the rotor, that is, when current flows only during a relatively short percentage of rotor revolution (electrical). The resulting substantial gaps in torque are then filled by the additional torque derived from the ferromagnetic elements, so that the resultant overall output torque from the rotor, on the motor shaft, will be substantially uniform.

The invention will be described by way of example with reference to the accompanying drawings, wherein.

Figure 1:
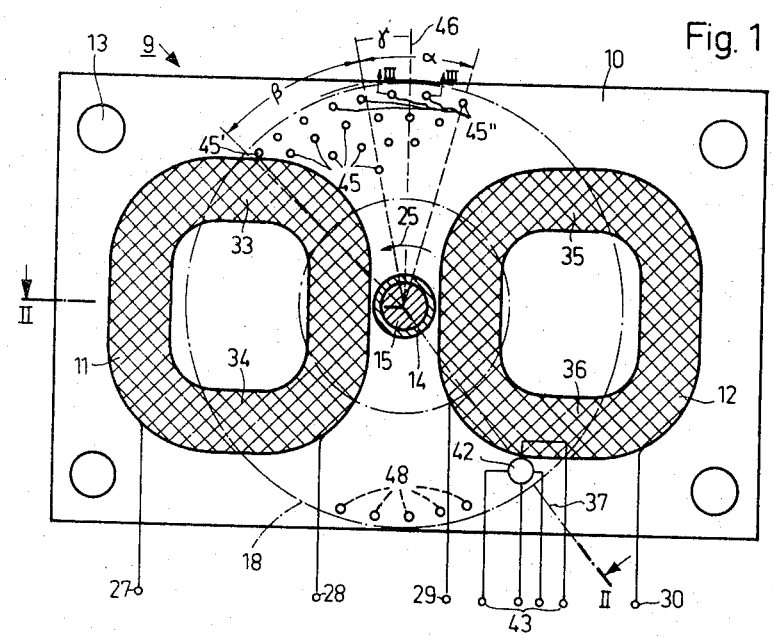
FIG. 1 is a top sectional view of the stator of the motor, taken along line I—I of FIG. 2.
Figure 6:
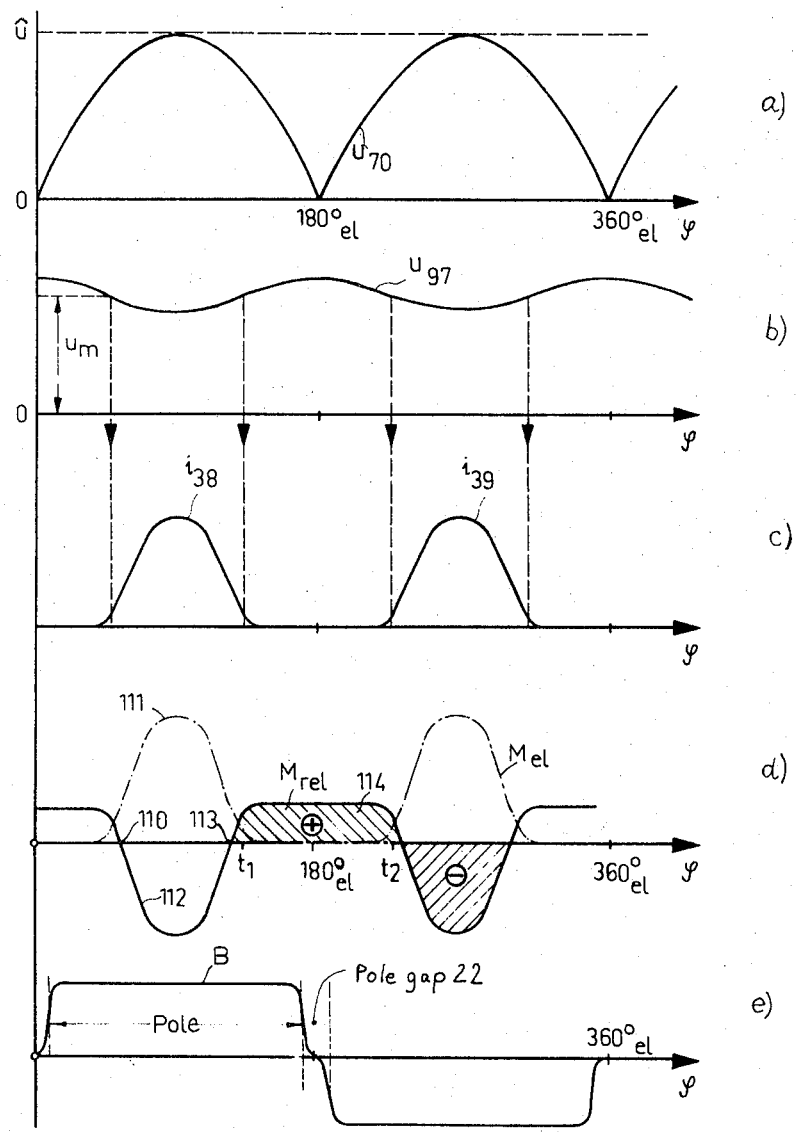
Figure 7:
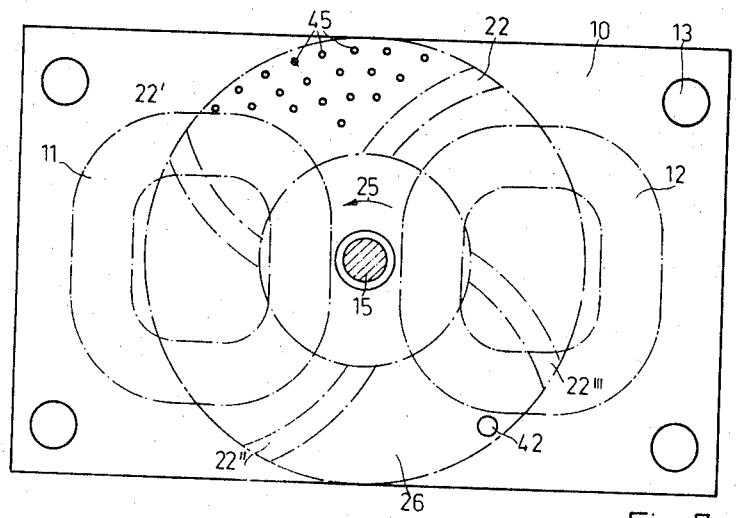
Figure 8:
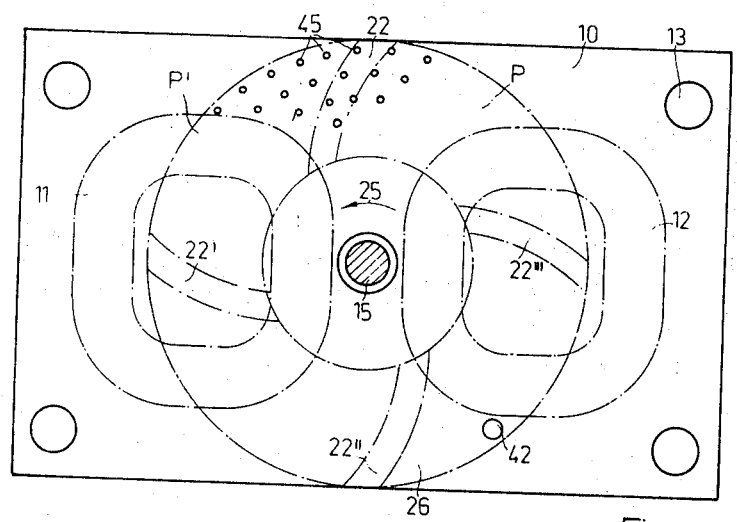
Figure 9:
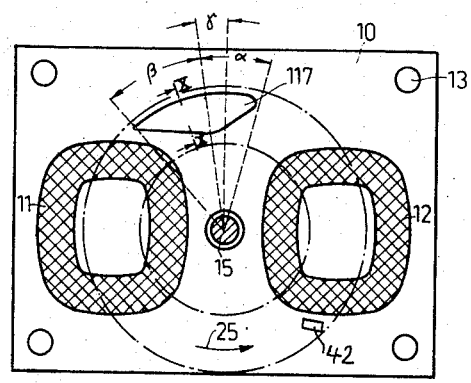
Figure 10:
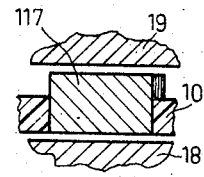
Figure 11:
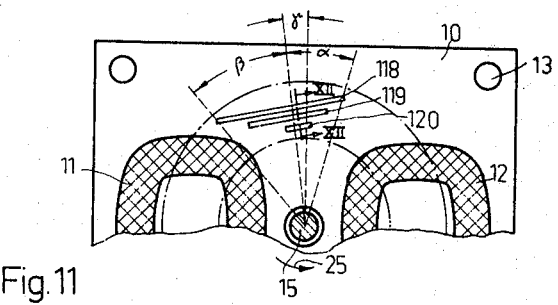
Figure 12:
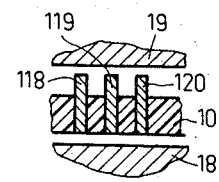
Figure 13:
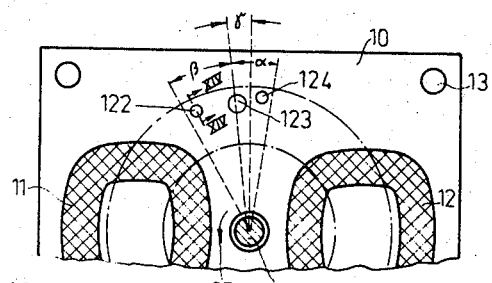
Figure 14:
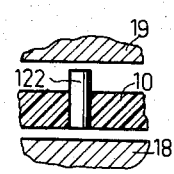
Figure 15:
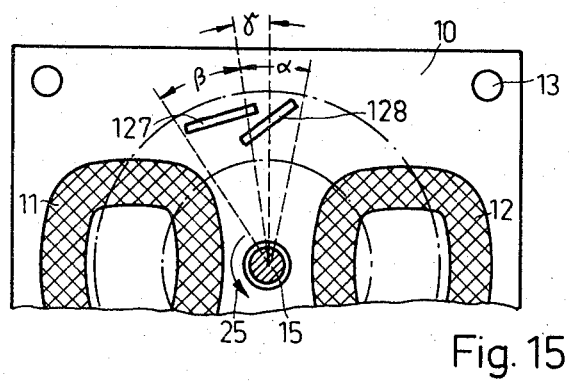
Figure 16:
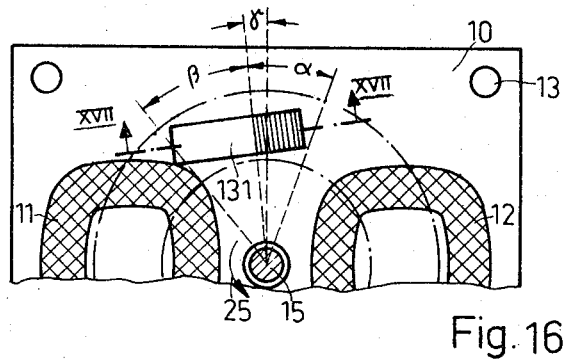
Figure 17:
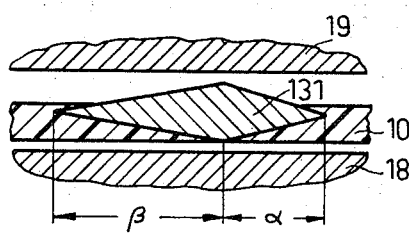
Figure 18:
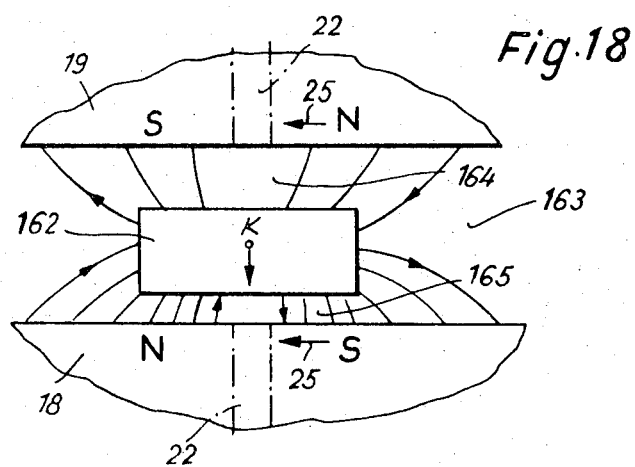
Figure 19:
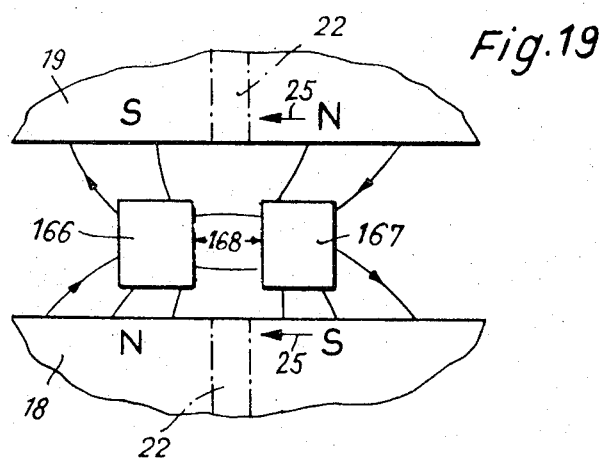
Figure 20:
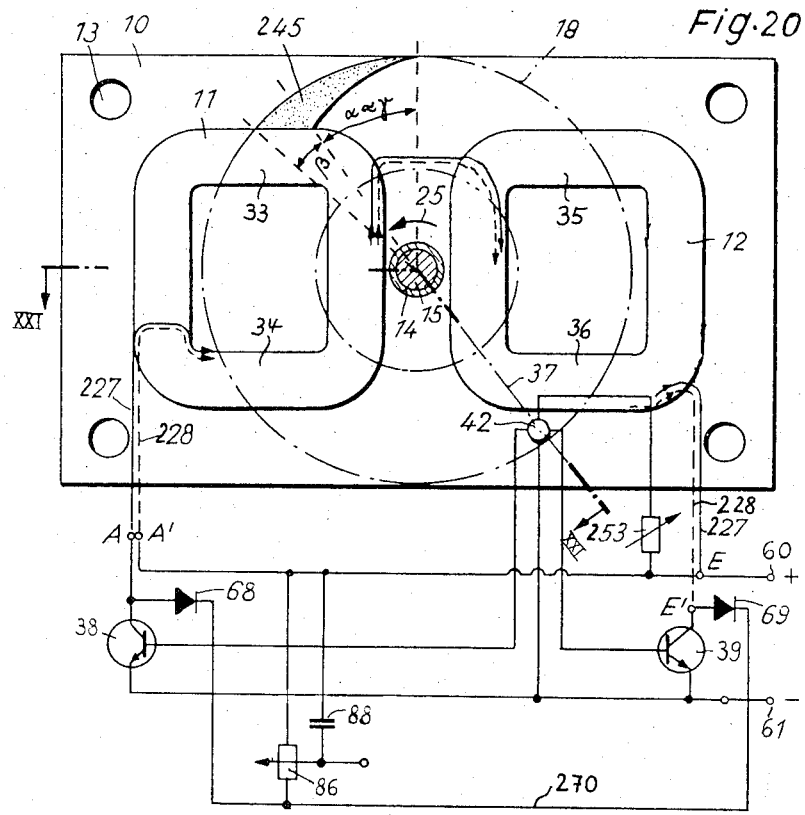
Figure 21:
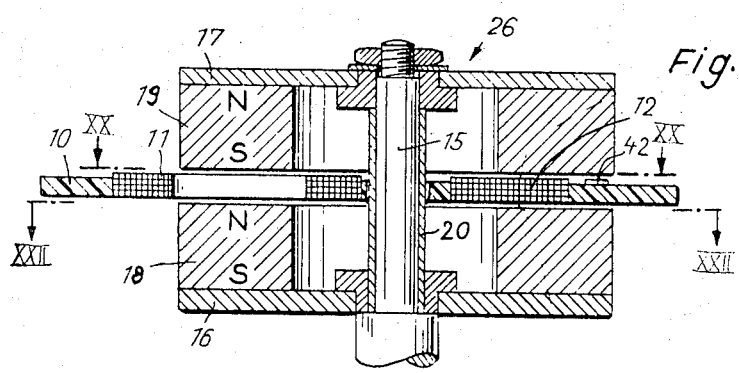
Figure 22:
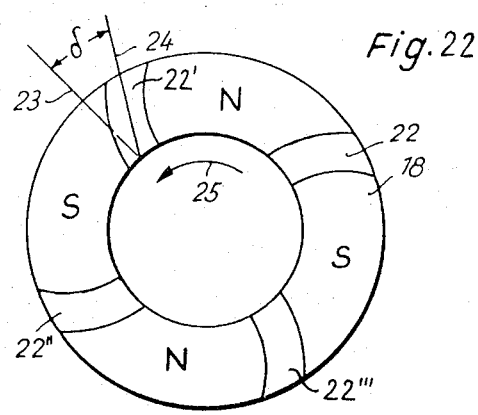
Figure 23:
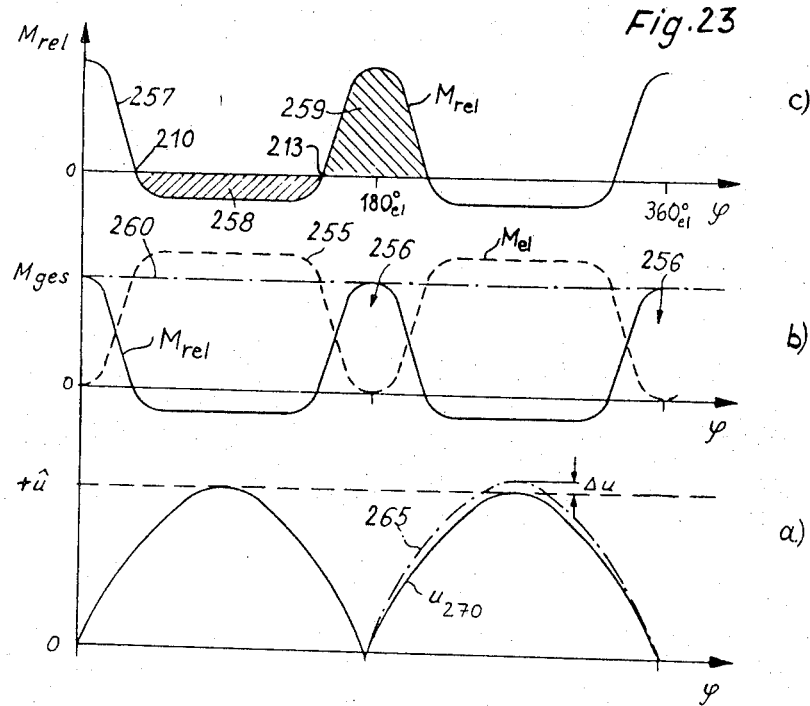

FIG. 6, collectively, is a series of graphs illustrating operation of the motor, and control thereof, in which the abscissa represents electrical degrees $\phi$ FIG. 7 is a schematic representation illustrating a stable rest position of the rotor;

FIG. 8 is a representation similar to FIG. 7 but illustrating an unstable rest position of the rotor;

FIG. 9 is a view similar to FIG. 1, with portions omitted, illustrating a different embodiment;

FIG. 10 is a a transverse fragmentary section taken along line X—X of FIG. 9;

FIG. 11 is a view similar to FIG. 9, of another embodiment;

FIG. 12 is a fragmentary section along line XII—XII of FIG. 11;

FIG. 13 is a view similar to FIG. 9 and illustrating another embodiment;

FIG. 14 is a fragmentary section taken along lines XIV—XIV of FIG. 13;

FIG. 15 is a fragmentary view similar to FIG. 9 and illustrating another embodiment;

FIG. 16 is a fragmentary view similar to FIG. 9 and illustrating a further embodiment;

FIG. 17 is a fragmentary cross section taken along line XVII—XVII of FIG. 16;

FIGS. 18 and 19 are schematic graphic representations illustrating the action of a core within an air gap, and resultant forces, for purposes of explanation;

FIG. 20 is a top view of another embodiment of a motor, taken along line XX—XX of FIG. 21;

FIG. 21 is a longitudinal cross-sectional view taken along line XXI—XXI, angled at 135°, of FIG. 20;

FIG. 22 is a top view of a rotor for the motor of FIG. 20, and taken along line XXII—XXII of FIG. 21; and FIG. 23 is a series of graphs to illustrate the operation of the motor of FIGS. 20-22.

Similar, or similarly acting parts will be referred to by the same reference numerals throughout the specification, and description of elements, and their functions, will not be repeated.

Figure 2:
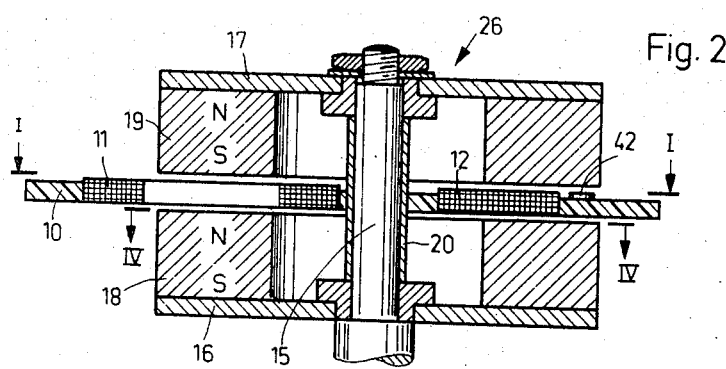
FIG. 2 is a longitudinal sectional view taken along lines II—II of FIG. 1, angled at 135°.

The motor 9 has as a carrier or stator member a base plate 10 of insulating material. The base plate 10 is formed with recesses, apertures or the like, in which a pair of core-less flat coils 11, 12 is secured. The coils 11, 12 are diametrically opposite to each other. The plate 10 of the motor 9 can carry additional elements associated with the motor, such as a control circuit for example, control elements and the like. Four attachment holes 13 are provided at the ends of the plate. The plate is formed with a central hole 14 through which a shaft 15 extends which is secured in suitable bearings (not shown). As seen in FIG. 2, a pair of soft iron disks 16, 17 is secured to shaft 15, spaced by a suitable spacer sleeve 20. Axially polarized ring magnets 18, 19 are secured to the soft iron disks 16, 17. The exact shape of the polarization of the magnets 18, 19 (which are the mirror images of each other) can best be seen in FIG. 4. The gaps 22 between the poles do not extend exactly radially outwardly, but rather are inclined by an angle $\delta$ with respect to an imaginary radius vector 23, through which the respective pole gap passes (see FIG. 4). The ring magnets 18, 19 are magnetized, as seen in FIG. 6, line e, to have approximately trapeze-shaped magnetization. The magnetization can be different, however, for example essentially rectangular or sinusoidal. The invention will be described with the preferred type and shape of magnetization illustrated in FIG. 6 (trapeze-shaped). If the magnetization is selected differently, however, the ferromagnetic elements (to be described) have to be located or arranged to fit the specific type of magnetization.

Figure 4:
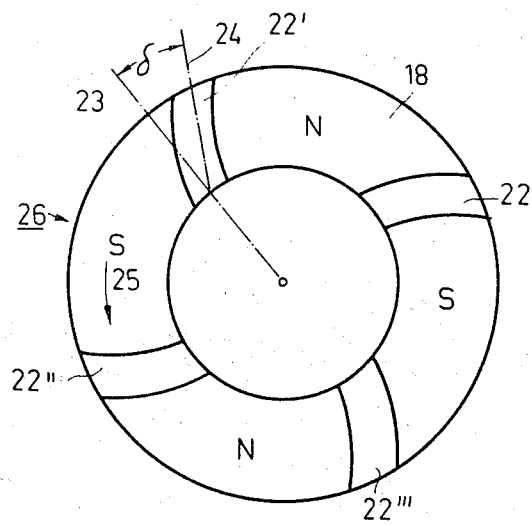
FIG. 4 is a schematic top view of the permanent magnet rotor of FIGS. 1 and 2 along lines IV—IV of FIG. 2, with the shaft and support elements omitted.

The approximate direction of the longitudinal axis of a pole gap 22 is shown in FIG. 4 at 24. The rotor rotates in direction of the arrow 25 (FIGS. 1, 4) and it can thus be seen that the pole gaps 22 are rotated backwardly with respect to the direction of rotation, relatively to the radius vector 23. In a preferred form, and as best seen in FIG. 4, the pole gaps 22 are additionally bent counter the direction of rotation. The bend may be slight and have, for example, the shape and form illustrated in FIG. 4. The entire rotor 26 essentially includes the parts 16–20 as well as the associated shaft 15, and such parts of the bearing structure (not shown) necessary to journal the rotor on a fixed support, for example plate 10.

The flat coils 11, 12 have terminals 27, 30, which are directly carried out from the coils. The coils are preferably wound as bifilar coils, so that their center terminals can then be directly connected, so that they need not be carried out to separate terminals, as will be described in more detail with respect to FIGS. 20–23. The coils are chorded, that is, are somewhat shorter than the associated polar arc, and their magnetically active portions 33, 34 and 35, 36, respectively, are essentially parallel to each other. As readily seen in FIGS. 1 and 4, the motor 9 is a four-pole motor, so that a mechanical angle of 180° corresponds to an electrical angle of 360°.

A Hall generator 42 is located next to coil 12 on plate 10 (FIG. 2); it is placed on a radius vector 37 which includes an angle of 45° (90°-el.) with a common axis of coils 11, 12 and has terminals 43 which are carried out.

In accordance with the invention, ferromagnetic elements 45 are located on the side of coil 11 backwardly, with respect to the direction of rotation. FIG. 1 illustrates these ferromagnetic elements 45 as adjacently located, but spaced ferromagnetic pins, leaving a space free of ferromagnetic substance therebetween.

Figure 3:
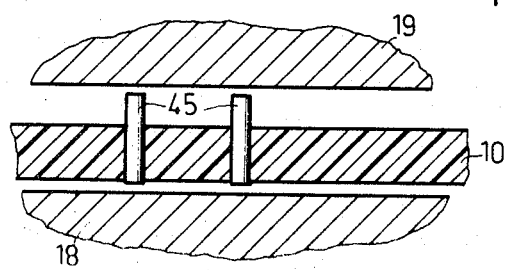
FIG. 3 is a fragmentary sectional view to an enlarged scale along line III—III of FIG. 1.

The shape of the elements 45, which are identical to each other, is clearly seen in FIG. 3; they are cylindrical pins of soft iron. The total active iron volume, looked at in the direction of rotation, and interacting with the rotor poles increases throughout a first angular range $\alpha$ approximately monotonously, and then decreases approximately monotonously, or uniformly over a second angular range $\beta$.

The region of quantity of the active iron volume, looked at in the direction of rotation, is offset with respect to a longitudinal axis 46 passing perpendicularly to the two coils 11 and 12 by an angle $\gamma$. The first iron pin 45', looked at in the direction of rotation, is located close to the side of the coil 33 and is within the range of the outer circumference passed by the rotor magnets 18, 19. A greater number of pins 45 is arranged at the outer circumference, the parallel inner tracks having a lesser number of pins, as clearly seen in FIG. 1.

One or more pins 45 may also be located at the diametrically opposite side of the stator 10, which improves the symmetry of the motor with respect to its axis of rotation. Pins 48 are then placed between coil portions 34, 36. If a larger number of pins 48 is placed, some of the pins at the outer circumference in the first group, for example the pins 45'' can then be omitted and replaced by the five pins 48 placed diametrically opposite. The axial forces acting on the rotor do then become more uniform; there is no change in the electrical operation of the motor, however.

The iron pins 45 generate an additional torque of a specific type, which complements the torque imparted to the rotor by coils 11, 12. This drive torque, derived from coils 11, 12, has a gap (with respect to time) since Hall generator 42 controls coils 11 and 12 sequentially, cyclically. During commutation, none of the coils have current flowing therethrough. This gap in current results in a gap of torque derived from the rotor; in accordance with the present invention, this torque gap is complemented by a magnetically generated torque, which can hereinafter be referred to as a reluctance torque, or as additional torque.

If the speed of the motor is to be controlled to a constant value, then it has been found desirable and necessary that the time during which current flows through coils 11 or 12 is reduced, that is, to increase the gap required for commutation. The electromagnetic torque which is then applied to the rotor will be relatively short with substantial gaps in driving torque therebetween. The reluctance torque therefore must then be effective over a substantially wide angle (electrically) in order to fill the gaps in driving torque due to the electromagnetic field generated by coils 11, 12, and to impart substantially smooth, uniform driving torque to shaft 15.

Figure 5:
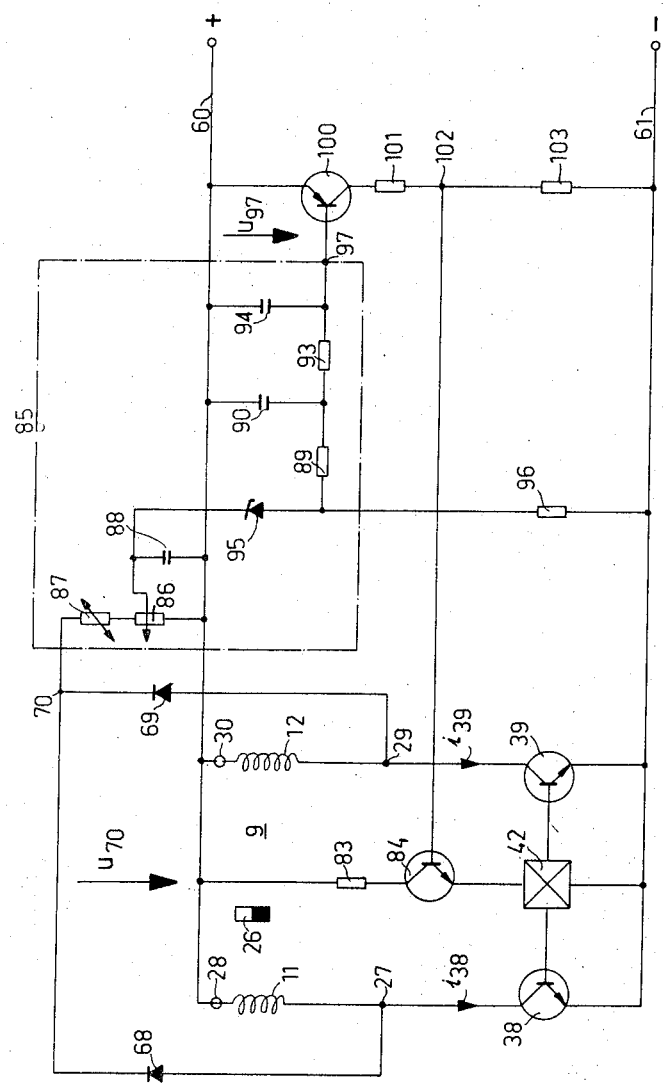
FIG. 5 is a schematic control circuit for the motor of FIGS. 1–4.

A speed control circuit for use with the present invention is illustrated in FIG. 5. Terminals 27, 29 of the two coils 11, 12 are connected to two diodes 68, 69, respectively, the cathodes of which are combined at a junction or bus 70. In operation, a half-wave voltage $u_{70}$ will appear at bus 70, the amplitude of which is representative of the speed of the rotor 26.

Hall generator 42 is connected to negative bus 61, and to a resistor 83 in series with the emitter-collector path of a transistor 84 which, then, connects to positive supply bus 60. The output voltages of Hall generator 42 are applied to the bases of a pair of npn transistors 38, 39, the emitters of which are connected to negative bus 61, and the collectors to the coil terminals 27, 29, respectively.

Voltage $u_{70}$ is applied to a phase shift filter network 85. The input to the filter network 85 includes a voltage divider formed of a negative temperature resistor 87 and a potentiometer 86. The NTC resistor 87 is used to compensate for the temperature dependency of the of the remanent induction of the rotor 26. This induction decreases with increasing temperature.

The phase shift filter 85 includes three series connected R-C elements, the first including resistors 86, 87 and capacitor 88; the second a resistor 89 and capacitor 90, and the third a resistor 93 and capacitor 94. A Zener diode 95 is connected between capacitor 88 and capacitor 90, the anode of which is connected over resistor 96 with negative bus 61. The Zener diode clamps the voltage at junction or line 70 by a constant value in negative direction; this voltage, ordinarily, in operation, is more positive than the voltage of the positive line 60, so that the voltage at the anode of Zener diode 95 will be less than the voltage of line 60. This phase shift network or filter shifts the phase of voltage $u_{70}$ by about 180° (see FIGS. 5 and 6). It has been found that the capacitors may have a fair tolerance. The filter network 85 further effects smoothing of the highly wavy voltage $u_{70}$, so that the output at terminal 97 from the filter network 85 is only slightly wavy, as seen in FIG. 6, graph b. The amplitude and phase of voltage $u_{97}$ is determined by the relative values of the components of the filter 85. Graph a of FIG. 6 shows the voltage $u_{70}$. The about 180° phase shift is clearly apparent by comparison of graphs a and b.

The voltage $u_{97}$ is applied to the base of a pnp transistor 100, the emitter of which is connected to positive line 60, whereas its collector is connected over resistor 101 to a junction 102, which, in turn, connects over resistor 103 to negative bus 61. Junction 102 is connected to the base of transistor 84.

Operation: When the junction 97 becomes negative with respect to positive bus 60, transistor 100 and with it npn transistor 84 become conductive. Since voltage $u_{97}$ is only slightly wavy, the turn-on and turn-off switching or commutation can be made to be very soft, resulting in currents $i_{38}$ and $i_{39}$, FIG. 6, graph c, flowing through the coils 11, 12 of the motor. This results in smooth running of the motor, little commutation interference or peaks and low voltage peaks upon turn-off. The efficiency is excellent, since the windings, as seen, receive their current during voltage maxima. Switching-on, and switching-off, can be speeded up in order to reduce losses in the transistors 38, 39; decreasing the switching time can be obtained by changing the dimensions of the filter network 85.

Speed control operation: If the speed of motor 9 is below the command value set by potentiometer 86, then the induced voltage $u_{70}$ will have a relatively small value and the d-c component $u_m$ of voltage $u_{97}$ will be relatively small. The transistor 100 will then receive at its base a potential which is more negative than the potential of line 60 for almost the entire time period, so that transistor 100 and with it transistor 84 are constantly, or almost constantly conductive. The armature current through windings 11, 12, respectively, will be effectively controlled entirely by the Hall generator 42. When the desired speed of the motor is reached, then the d-c component $u_m$ will be of a value which causes the base of transistor 100 to become, for parts of the time, more positive than its emitter, thus causing blocking of transistors 100 and 84. Hall generator 42 then is blocked, and cannot provide control currents for transistors 38, 39, thus causing transistors 38, 39 to remain blocked. When voltage $u_{97}$, due to the waviness thereof, causes the base of transistor 100 to become negative with respect to the emitter, transistor 100 will become conductive, causing conduction of transistor 84 so that Hall generator 42 will be energized and, depending on the then instantaneous magnetic field of rotor 26, will control the transistor 38, or 39, respectively, to become conductive, thus causing currents $i_{38}$, or $i_{39}$ to flow through the respective windings. The current curves which then will be obtained are seen in FIG. 6, graph c. Hall generator 42 thus, effectively, functions like an AND-gate, that is, it provides for logic conjunction of the information due to the direction of magnetic flux of rotor 26 and the electrical information derived from transistor 100.

If the speed of the motor increases over that which is desired, transistors 100 and 84 will be blocked for longer periods of time, up to complete blockage, so that motor 9 will receive current for a lesser and lesser period of time, or no current at all, and, since it will receive less driving energy, or none, its speed will drop.

The control, in accordance with the present invention, influences the width and/or the amplitude of the current pulses applied to the motor, that is, the overall energy. The dynamic of control is excellent and rapid start-up to commanded speed will be obtained, without overshoot or hunting. The efficiency is excellent since the current pulses through the windings 11, 12 are properly phased relative to the induced voltage $u_{70}$.

Current flow through the windings 11 and 12, that is, currents $i_{38}$ and $i_{39}$ cause an electromagnetic torque $M_{el}$, which has a time distribution as seen in FIG. 6, graph d in chain-dotted lines. This torque, as can be seen, has substantial gaps, which may be greater than 90°-el. These gaps in torque are complemented by the reluctance torque $M_{rel}$ derived from the ferromagnetic elements 45 (and/or 48) described in connection with FIG. 1. The reluctance torque $M_{rel}$ is likewise seen in FIG. 6, graph d. The torques $M_{el}$ and $M_{rel}$ complement each other; the reluctance torque $M_{rel}$ occurs between the time periods $t_1$ and $t_2$, and will be effectively constant. This is important, since only if a substantially constant driving reluctance torque is obtained, an overall constant torque over the entire angular displacement of the rotor can be obtained, which is important particularly for audio applications, such as tape recorders, phonograph turntables and the like.

Upon addition of the two torques $M_{el}$ and $M_{rel}$, an effectively constant overall torque is obtained. This overall torque is part of the design of the motor; such a motor, then, can be used to drive an appliance which requires a drive torque in the order of magnitude of the design value, for example a ventilator, a printer, audio equipment, or the like. The control system necsssary to obtain this output is simple and made of few and inexpensive components.

The angular extent of the induction B with respect to a developed rotor 26 is seen in FIG. 6, graph e. The poles are wide, the magnetic distribution is approximately trapeze-shaped, and there are small gaps between the poles.

Theoretical considerations, with reference to FIGS. 7 and 8: The concept of a reluctance torque is best understood by considering the rotor 26 having pole gaps 22, 22', 22'', 22''', first, in quiescent condition. The rotor 26 is shown in chain-dotted lines, the position corresponding to point 110 in FIG. 6. All the iron pins 45 are located between two opposite poles of the rotor 26; in other words, both gaps 22, 22' of these poles are beyond the range of pins 45. If the coils 11, 12 are not energized, then the rotor 26 will remain in this quiescent position, that is, the reluctance torque has a value of zero.

Upon displacing the rotor from its quiescent condition in the direction of arrow 25 (FIG. 8), a driving moment is required, since rotor 26 will have the tendency to twist into a position in which the maximum active iron volume of pins 45 is within a region of its poles. This driving moment is derived, in operation, from the current flowing through the coils 11, 12, respectively. The driving torque produced by these coils is indicated in FIG. 6 at 111. The retarding or braking torque, caused by the presence of pins 45, is indicated at 112. In the arrangement of the pins 45 as shown in the figures the curves 111, 112 are mirror images, with respect to one half of the average driving torque of the motor 9.

FIG. 8 illustrates the position of the rotor 26 about 65°-el. after point 111. In this position, a substantial number of pins 45 are within the region of the pole gap 22. The number of pins opposite the poles is a minimum. As clearly apparent from FIG. 8, pins 45 are arranged in rows which form an acute angle with the pole gap 22. The overall magnetic resistance of the magnetic circuit, and thus the magnetic energy stored in the air gap will have a maximum in this position. As seen in FIG. 8, a portion of pins 45 will attract the pole P of the rotor 26, another portion, however, will attract the pole P' of the rotor 26. This position, then, is an unstable quiescent position of the rotor 26, corresponding to point 113 in FIG. 6, that is, to a position in which the reluctance torque passes through zero.

As additionally seen in FIG. 6, points 110 and 113 should be as closely symmetrical to the electrical torque as possible. The electrical torque preferably is phasesynchronous with the voltage $U_{70}$. In practice this is obtained by suitable selection of the angle $\gamma$ (FIG. 1); the angles $\alpha$ and $\beta$ determine the form or shape of the reluctance torque. To obtain the desired, even output torque from the motor, by complementing the reluctance torque and the electric torque, at points 110 and 113 the electrical torque 111 should have about the value of this overall output torque, that is, the electrical torque 111 ought to begin in advance of the point 110 and ought to terminate after the point 113. This can be accomplished by suitable dimensioning of the network of the control circuit of FIG. 5.

FIGS. 7 and 8 further show how, in accordance with the present invention, the pole gaps 22 extend about perpendicularly to the magnetically active coil section 33, but about parallel to the magnetically active coil section 34. Similar relationships pertain for the coil 12. This arrangement permits placing the ferromagnetic elements 45 and the Hall generator 42 adjacent the coil and not over or beneath the coil 11 (or 12, respectively) since the gaps 22, upon passing elements 45 (or Hall generator 42) can cooperate simultaneously with the adjacent magnetically active portion of the coil, for example portion 33.

The density of placement of the pins 45 beneath gap 22 decreases upon further rotation of the rotor 26, more slowly than it has initially increased. This is seen in FIG. 8. Also, the overall number of the pins 45 beneath the poles P and P' increases more slowly, so that the magnetic energy decreases more slowly than it has increased. Thus, the released or delivered reluctance torque indicated at 114 in FIG. 6 is smaller than the braking reluctance torque 112, but acts over a greater angle of rotation, or displacement, and corresponds about to the angle $\beta$ of FIG. 1. In accordance with the law of conservation of energy, the energy taken up in the braking region 112, in FIG. 6, which is indicated by a negative sign, must be equal to the energy delivered in the driven range 114, indicated with a plus sign. In this theoretical consideration, losses due to a change in magnetization in the pins have been neglected. As can be seen in FIG. 6, the driving reluctance torque 114 has the value of the driving torque for which the motor is designed.

The amplitude and effective range of the braking reluctance torque 112, as can be seen in the example referred to, is essentially determined by the angle $\alpha$ (FIG. 1). The magnetic resistance, looked at in the direction of rotation, decreases over the range of angle $\alpha$; the amplitude and range of the driving reluctance torque 114 is essentially determined by the angle $\beta$, in which the magnetic resistance increases.

The reluctance torque should be effective in any position of the rotor in which it effectively complements the electric torque. The position of the pins 45 with respect to the coils 11 and 12, zone of the maximum of iron material of which is defined by the angle $\gamma$ (FIG. 1) is thus to be suitably chosen. As a consideration, rotor 26 in the position in FIG. 7 is in stable equilibrium, since the stored magnetic energy has a minimum, whereas in the position in FIG. 8, the magnetic energy is a maximum and in this position the equilibrium is an unstable equilibrium. The reluctance torque, in both positions, is equal to zero, or, considered from the point of view of a curve, passes through null. As pointed out, the two null passages 110, 113 should be approximately symmetrical to the driving electrical torque 111.

The above-described cycles repeat for each pole of the rotor 26; in a four-pole rotor, as illustrated, braking torque and driving torque will alternate four times for each revolution, and the rotor passes four times through an unstable and stable equilibrium position.

If the rotor 26 is differently magnetized than as shown in graph e of FIG. 6, for example, has narrower poles and wider gaps, or is magnetized in a sinusoidal way, then the reluctance torque can be similarly influenced by suitable variation of the magnetic resistance of the magnetic circuit. The angles $\alpha$, $\beta$ and $\gamma$ of FIG.

1 will, however, then have different relationships with respect to each other and to the overall structure and may have different values, and their correlation with torque is different.

FIGS. 9-17 illustrate different forms of the invention in which the structure of the ferromagnetic elements is changed. The basic structure of the motor corresponds to that of FIGS. 1-4 in all essential parts. The magnetization of the poles is carried out as illustrated in FIG. 6, line e, and the structures to be discussed assume this magnetization and that the electromagnetic driving torque $M_{el}$ is similar to that shown in FIG. 6.

Embodiment of FIGS. 9 and 10: A single element 117, of plastic material with soft iron powder or ferrites embodied therein, is secured to the base plate 10. The element 117 may also be a shaped block of soft ferrite. The angles, as shown, have the same relationship as in FIG. 1, to the description of which reference is made.

Embodiment of FIGS. 11 and 12: Three soft iron elements 118, 119, 120 in the form of strips of different lengths but equal widths are secured to the baseboard 10. The arrangement of these strips is so taken, and they are so dimensioned and located that their effect is similar to that of pins 45 as in the example in connection with FIGS. 1-4.

FIGS. 13 and 14: Three soft iron pins 122, 123, 124 of equal axial length, but of different thickness, are placed in the base 10. The center pin 123 is thicker than the two outer pins 122, 124.

FIG. 15: Soft iron strips 127, 128 of equal length and width are placed on base 10, arranged at an angle with respect to each other so that there will be some overlap between the strips (in the region of maximum presence of magnetic material). The location of the strips with respect to a circle having a center at shaft 15 shows that the amount of iron material swept by any pole changes non-linearly with respect to arcuate displacement.

FIGS. 16 and 17: A ferromagnetic body 131 of equal width but variable thickness (in a dimension transverses to the plane of the stator plate 10) is secured to the base or stator plate 10. As seen in FIG. 17, the variation in thickness is non-linear with respect to longitudinal dimension. In the angular range $\alpha$, thickness, looked at in the direction of rotation, increases rapidly; in the angular range $\beta$, the thickness decreases but at a much more gradual rate. The element or body 131, like the body 117 (FIGS. 9, 10) may be a plastic with soft iron powder embedded therein, ferrites embedded therein, or suitably shaped soft ferrite material.

In all the illustrations of FIGS. 9-17, the magnetic active iron volume increases in the first angular range $\alpha$ to a maximum and decreases in the second angular range $\beta$ to a minimum, in which $\beta$ is greater than $\alpha$. The position of the maximum is determined by the angle $\gamma$. It is possible to obtain the desired form of the reluctance torque with a single ferromagnetic element (FIGS. 9, 10, 16, 17, 20) or with a plurality of ferromagnetic elements, located adjacent each other and spaced from each other and secured to the stator, cooperating with the magnetic field of the rotor 26. The solution of separate elements is preferred since it has been found that in actual operation the running smoothness of the rotor is improved. This will be explained in connection with FIGS. 18 and 19.

FIG. 18 illustrates the flux and force relationships when a massive ferromagnetic element 162, for example a soft iron body, is located in an air gap 163 non-symmetrically with respect to magnets 18, 19. The position shown is one in which the pole gap 22 just passes the body 162. It is practically impossible to avoid some non-symmetrical placement of a body within an air gap.

The body 162 is separated from the magnets 18, 19 by two air gaps 164, 165 of unequal length. In the shorter or narrower air gap 165, magnetic flux will be substantially greater than the flux at the greater air gap 164, as indicated by the bunching of field lines — FIG. 18. This unsymmetry of flux has the result that element 162 in the position where it bridges the pole gap 22 is not equally attracted by the two magnets 18, 19; rather, an axial force K will arise, in the direction to the smaller air gap 165. This force K will occur each time when a pole gap 22 passes the element 161. In operation, the motor will be subjected to cyclically recurring axial excursions or shock, interfering with its smoothness of operation.

If two separated ferromagnetic elements 166, 167 are used, as illustrated in FIG. 19, then this disadvantage can be largely avoided. Similar parts have been given similar reference numerals as in FIG. 18. An air gap 168 will occur between the elements 166, 167, which changes the magnetic conductivity when a pole gap 22 passes, which is otherwise formed by elements 166, 167 between opposite poles N, S of the magnets 18, 19, respectively. The transverse flux is substantially decreased and the forces which act on elements 166, 167 in axial direction, that is, for example force K, is substantially decreased. It is then of importance to so associated the ferromagnetic elements and to so arrange these elements that the magnetic conductivity in the plane of the air gap, transverse to the pole gap, is as small as possible. In the arrangement according to FIG. 15, the elements 127, 128 bridge the pole gap 22 when it passes adjacent the air gap; the axial magnetic force is, however, substantially reduced with respect to a single massive element as ilustrated, for example, at 245 in FIG. 20. The edges of the ferromagnetic elements can be beveled, or otherwise flattened so that the axial force which arises, although already decreased in amplitude, is changed gradually and permitted to decrease gradually, additionally providing for smooth running of the motor. Substantial reduction of axial magnetic forces can be obtained, for example, by the solution indicated in FIGS. 1 to 4, by using pins 45 and/or 48. The other motor structures, however, which are much simpler to manufacture, may supply satisfactory results for many uses. In some applications slight axial oscillation may even be desired, for example to reduce wear on some types of bearings.

Embodiment of FIGS. 20 and 21 (and with reference to FIGS. 22, 23): This motor is an uncontrolled motor having bifilar windings. A ferromagnetic element which is used is a single massive iron body 245 having an iron volume which increases in the first angular range $\alpha$ and decreases in the second angular range $\beta$. The second angular range $\beta$ is smaller than the first angular range $\alpha$, in contrast to the previous embodiments. The reason is that in a motor in which the speed is not controlled, the gaps in electromagnetic torque are much shorter than the torque imparted by the driving force of the coils, so that the reluctance torque should have a different form, and distribution.

Similar elements and similar parts have been given the same reference numerals and will not be described again. FIG. 21 essentially corresponds to FIG. 2, and FIG. 22 essentially corresponds to FIG. 4, the graph in FIG. 6 e) illustrating the induction relationships with respect to displacement angle are also applicable for the motor of FIG. 22.

The two flat coils 11, 12 are wound in bifilar form throughout, that is, have two parallel wires 227, 228, the ends of the wire 227 being indicated at A and E, and the ends of the wire 228 being indicated at A' and E'. Each coil 11, 12 has a plurality of windings, as in FIG. 1. The two wires 227, 228 are the two halves of a set, one having current flowing therethrough in one direction and the other having current flowing therethrough in another direction. To control the current in the wires 227, 228 of coils 11, 12, a pair of npn transistors 38, 39 is connected as in FIG. 5, that is, the emitters are connected to negative bus 61, the collector of transistor 38 with terminal A of wire 227 and the collector of transistor 39 with terminal E' of wire 228. Terminals A' and E are joined together and connected to positive bus 60. The bases of the two transistors 38, 39 are each connected to an output of a Hall generator 42, the two control inputs of which are connected on the one hand with negative bus 61 and on the other to an adjustable resistor 253 and then to the positive bus 60.

The two diodes 68, 69, resistor 86 and capacitor 88 (see FIG. 5) are also shown; the cathodes of the two diodes are connected to bus 270.

The voltage between line 270 and positive bus 60 is seen at graph - FIG. 23 — line a. This voltage is proportional to the speed of rotor 26 and, as seen, is effectively a series of half waves, that is, is very wavy. If motor 9, in the circuit of FIGS. 1 to 5, has certain non-symmetrical features, for example because the poles of rotor 26 are not exactly equally magnetized, or because coils 11, 12 have non-uniform numbers of windings, then one half-wave, for example half-wave 265 of FIG. 23 may be greater than the other by the value $\Delta u$. Such non-symmetrical relationships are very bothersome in the control circuit of FIG. 5 and the bifilar winding illustrated in FIG. 20 is of advantage also in the embodiment of FIG. 1. The voltage $U_{270}$ obtained, as seen in FIG. 23, has practically identical amplitudes in all instances, thus permitting optimum speed control. The type of winding illustrated in FIG. 20 has the additional advantage that the drive torque derived from windings 11, 12 is symmetrical to the motor shaft 15 and thus does not cause lateral loading on the motor shaft, improving further the smoothness of operation of the motor.

The torque relationship is illustrated in the graph b of FIG. 23. The electromagnetic torque $M_{el}$, illustrated by dashed line 255 has relatively short gaps 256, since the current in windings 11 and 12 is controlled directly by Hall generator 42. For example, if a North pole is located beneath Hall generator 42, then it will switch the one transistor to be conductive; if the Hall generator has a South pole passing thereover, it switches to the other of the two transistors. Thus, only during commutation, that is, in the range of the angle 0°-el., 180°-el. and 360°-el. (with reference to FIG. 23), will motor current be interrupted. The gaps 256, in comparison to the torque gaps illustrated in FIG. 6 in a control led motor, are therefore very small. The reluctance torque $M_{rel}$ has the shape shown by curve 257, that is, has a long braking torque 258 and a relatively short, but powerful driving torque 259. The resulting combined torque is seen at chain-dotted line 260 which, in this instance also, is practically even, since the two torques $M_{el}$ and $M_{rel}$ complement each other, as is readily apparent from graph b. The level of torque 260, indicated on the ordinate $M_{ges}$ then would be the design torque of the motor.

Instead of the single iron core 245 the motor may have iron elements illustrated in connection with any of the other drawings, the angles $\alpha$, $\beta$ and $\gamma$, as well as the iron volume however being so selected that the relationship of the reluctance torque will be as shown in the graph c of FIG. 23 which illustrates the relationship of reluctance torque with respect to angle of rotation. The stable position of equilibrium 210, the unstable position of equilibrium 213 (FIG. 23) of the rotor, and the size of the driving torque 259, are the essential reference values which are necessary for the motor design, since their relative position resp. amplitude are essentially determined by the electrical structure of the motor. To obtain a resultant torque as illustrated in line 260, graph FIG. 23 line b, with a relatively short but powerful driving torque 259, that is, with short gaps in torque from the electrical drive, angle $\alpha$ must be selected to be effectively greater, and angle $\beta$ to be suitably small, that is, the angular relationships are reversed with respect to FIG. 6, and will be substantially as shown in FIG. 20.

Various changes and modifications may be made within the inventive concept.

A motor of FIG. 1 may have the following arrangement and dimensions: coils 11, 12, 2×600 turns (bifilar) of 0.13 mm diameter wire, supplied from buses 60, 61 at a voltage of 24 volts. Axial dimension of the coils: 3.0 mm; axial dimension of the rotor magnets 18, 19: 9.0 mm, the magnets being made of bariumferrit. Diameter of pins 45, distributed approximately as shown in FIG. 1: 1 mm $\phi$ Diameter of rotor 26: 52 mm $\phi$ Output torque, controlled by a circuit in accordance with FIG. 5, at 450 rpm speed: 0.2 Ncm ($\approx$20 cmp)

Maximum torque, operated uncontrolled (circuit of FIG. 20), with changed distribution of magnetic pins (reversal of position of angles $\alpha$ and $\beta$): 1 Ncm ($\approx$700 cmp)

The motor of FIG. 20 also has two bi-filar coils of 600 turns each for each wire 227, 228, respectively, of 0.13 mm enamel magnet wire. The motor is suitable to drive a phonograph turntable

I claim:

1. Axial air gap, brushless d-c motor comprising
    a stator having winding means including at least one core-less flat coil (11, 12) located transversely to the axis of the motor;
    a permanent magnet (18, 19) rotor (26) journalled and located such that its magnetic field interacts with the electromagnetic field of the stator coil or coils;
    means periodically energizing the winding means, or coils (11, 12) as a function of rotor position to product an alternating electromagnetic field and to cause an electrodynamic driving torque ($M_{el}$) to be applied to the rotor, said driving torque being interrupted during gaps of energization of the stator;

and ferromagnetic means (45, 48; 117; 118, 119, 120; 122, 123, 124; 127, 128; 131; 245) having soft iron characteristics located on the stator within the magnetic field of the permanent magnetic rotor to interact with the field from the rotor and generating during operation an additional torque ($M_{rel}$) effective as a positive driving torque during the gaps of generating of driving torque ($M_{el}$) due to the gaps in energization of the stator, said soft iron ferromagnetic means being located on the stator with respect to the location of the winding means such that the additional torque ($M_{rel}$) produced thereby during operation is substantially in phase opposition to the alternating component of the torque caused by energization of the stator winding means.

2. Motor according to claim 1, wherein the ferromagnetic means cooperating with the magnetic field of the permanent magnet rotor comprises material of soft iron characteristic present in increasing volume through a first angular range ($\alpha$) and of decreasing volume through a second angular ($\beta$), said first and second angular ranges being arranged on the stator, in the direction of rotation of the rotor.

3. Motor according to claim 2, wherein the increase and decrease of magnetic substance is essentially monotonic.

4. Motor according to claim 2, wherein the second angular range ($\beta$) adjoins the first angular range ($\alpha$).

5. Motor according to claim 2, wherein the first and second angular ranges, together, have a value of about 100°-el. to 180°-el.

6. Motor according to claim 2, wherein the termination of the first angular range ($\alpha$), with respect to the direction of rotation of the motor, is about 180°-el. to 120°-el. + $n \cdot 360°$-el., in advance of the radial central axis of at least one of the coils, wherein the value of $n = 0, 1, 2, 3, \ldots$ or any integer.

7. Motor according to claim 2, wherein the location of one stable rotor position (FIG. 7; 110; 210), in which the maximum active ferromagnetic substance interacts with a pole (P, P') of the permanent magnet rotor (26) is located about at the initial position of the effectiveness of the electromagnetic driving torque (111; 255).

8. Motor according to claim 7, wherein the stable rotor position (110, 120) follows, in time, after energization of said at least one coil (11, 12).

9. Motor according to claim 7, wherein a stable rotor equilibrium position (110, 210) coincides approximately with occurrence of a value of the electromagnetic torque being delivered to the motor (111, 255) which valve corresponds to the average torque (260) for which the motor is designed.

10. Motor according to claim 2, wherein the rotor has an unstable equilibrium position (FIG. 8; 113; 213) in which a portion of the active iron volume is located in the region of a gap (22) between poles of the rotor (26), said region corresponding to a position in which the reluctance torque ($M_{rel}$; 112, 114; 257) passes through zero or null (113), and coincides approximately with termination of energization resulting in electromagnetic torque (111; 255).

11. Motor according to claim 10, wherein termination of the current in said at least one coil (11, 12) follows, in time, after the unstable equilibrium position (113, 213).

12. Motor according to claim 10, wherein the unstable equilibrium position (113, 213) coincides approximately with a value of the electrical drive torque (255) which corresponds to the average drive torque (260) for which the motor is designed.

13. Motor according to claim 1, wherein the active ferromagnetic material, with respect to the angular rotation of the motor, increases in the first angular range ($\alpha$) having a value from between 50°-el. to 120°-el.

14. Motor according to claim 2, wherein the second angular range ($\beta$) includes an angle of from 50°-el. to 120°-el.

15. Motor according to claim 1, wherein at least a portion of the active ferromagnetic means is located in advance of said at least one coil, with respect to the direction of rotation (25) of the rotor;

said coil having a portion extending in the direction of a chord of the circle encompassed by the rotor, upon rotation, and wherein a portion (45') of said ferromagnetic means is located in the region included by the sector between the outer circumference of the stator surface covered by the rotor magnet (18, 19) and said portion (33) of the coil extending along the chord.

16. Motor according to claim 1, wherein (FIGS. 1–4; 11, 12; 13, 14; 15) said ferromagnetic means comprises a plurality of spaced ferromagnetic elements.

17. Motor according to claim 16, wherein (FIGS. 1–4; 13, 14) said ferromagnetic elements comprises essentially cylindrical soft iron pins extending approximately perpendicularly to the plane of the air gap.

18. Motor according to claim 16, wherein (FIGS. 11, 12; 15) said ferromagnetic means comprises a plurality of strips, arranged in rows.

19. Motor according to claim 18, wherein at least one of the strips is oriented to coincide approximately with the location of the gaps between poles of the motor.

20. Motor according to claim 1, wherein the ferromagnetic means comprises ferromagnetic elements arranged at the outer circumference of the circle defined by the rotor, above the stator, over a greater angular extent than the volume of active ferromagnetic means located on tracks concentric to said outer circumference and closer to the axis of the rotor.

21. Motor according to claim 1, wherein said ferromagnetic elements (45, 48) being arranged symmetrically with respect to the axis of the rotor (FIG. 1).

22. Motor according to claim 1, wherein the ferromagnetic means comprises ferromagnetic elements (118, 119, 120; 122, 123, 124) having respectively different volumes of ferromagnetic material (FIGS. 11, 12; 13, 14).

23. Motor according to claim 1, wherein the ferromagnetic means comprises soft iron elements having an approximately rectangular cross section with reference to the plane of the air gap.

24. Motor according to claim 22, wherein the ferromagnetic elements comprises elongated iron elements (118-120; 127, 128) located at least in part approximately tangentially to the axis of rotation of the motor and placed in the air gap (FIGS. 11, 12; 15).

25. Motor according to claim 23, wherein at least two elongated soft iron strips (127, 128) are provided, one strip being located within a first angular range ($\alpha$), with respect to the direction of rotation (25) of the motor and inclined inwardly; the second strip (127) being located in a second angular range (β) and approximately tangentially to a circle concentric with the axis of rotation (15) of the axis of the motor (FIG. 15).

26. Motor according to claim 25, wherein the two soft iron strips (127, 128) overlap in an intermediate range within the first and second angular ranges.

27. Motor according to claim 1, wherein the ferromagnetic means comprises a single ferromagnetic element comprising pulverized soft iron within a binder (FIGS. 9, 10; 17; 20).

28. Motor according to claim 1, wherein the ferromagnetic means comprises a single shaped body (117, 131) of soft ferrite (FIGS. 9, 10; 17; 20).

29. Motor according to claim 1, wherein the ferromagnetic means comprises a single shaped body (117) of approximately uniform thickness and variable dimensions, in radial direction, over its longitudinal extent (FIGS. 9, 10).

30. Motor according to claim 1, wherein the ferromagnetic means comprises a single shaped body (131) of essentially uniform width but variable thickness (FIGS. 16, 17).

31. Motor according to claim 1, wherein the means energizing said winding means are connected to energize the coils in synchronism with rotation of the motor, said energization being effected to provide drive torque to the motor approximately symmetrically to the instant of time in which the induced electro-motive force ($u_{70}$) in said at least one coil (11, 12) has a maximum.

32. Motor according to claim 31, further comprising a speed control circuit, said speed control circuit including means controlling the winding energization means to energize the winding means by a current having a angle of current flow through said at least one coil of less than 180°-el.

33. Motor according to claim 32, wherein the angle of current flow is less than about 120°-el.

34. Motor according to claim 33, wherein the angle is about 90°-el.

35. Motor according to claim 1, wherein the rotor poles are magnetized approximately trapezoidally.

36. Motor according to claim 1, wherein the rotor poles are magnetized approximately sinusoidally.

37. Motor according to claim 1, wherein the rotor poles are magnetized to have an approximately rectangular extent of magnetization with respect to circumferential distance.

38. Motor according to claim 1, wherein said at least one coil has magnetically active coil sections (33, 34, 35, 36) which extend at least in part in the direction of a chord with respect to the circle defined by the rotation of the rotor.

39. Motor according to claim 38, wherein said coil sections extending from the direction of the axis of the motor outwardly are mutually inclined with respect to each other.

40. Motor according to claim 1, wherein the permanent magnet rotor comprises at least two poles separated by pole gaps (22), the longitudinal axes (24) of the gaps (22) being inclined with respect to a radius vector (23) counter the direction of rotation (25) of the motor by an angle of inclination (δ).

41. Motor according to claim 40, wherein the gaps between the poles are curved (FIG. 4; 22).

42. Motor according to claim 1, wherein at least one of said ferromagnetic means is located within the air gap (163) of the motor.

43. Motor according to claim 1, said motor comprising a base support plate (10), said coil, or coils (11, 12) being secured to said plate; at least one aperture formed in said plate (10); said ferromagnetic means being secured in said aperture.

44. Motor according to claim 1, wherein said coil, or coils are wound in bifilar manner (FIG. 20), and said periodic energizing means comprises controllable semiconductor elements (38, 39), one each of said controllable semiconductor elements being connected to a respective conductor (227, 228) of the bifilar winding to control the current flowing through the respective winding.

45. Motor according to claim 44, further comprising sensing means (68, 69) connected to each of the bifilar windings (227, 228) to sense induced voltages ($u_{270}$) in each one of the conductors of the windings upon rotation of the permanent magnet rotor with respect to said windings, and controlling energization of said semiconductor means as a function of sensed induced voltage.

46. Motor according to claim 45, wherein the sensing means comprises connected diodes (68, 69).

47. Motor according to claim 1, further comprising rotor position controlled commutation element (42) and a speed control circuit (FIG. 5), said speed control circuit controlling the effectiveness of said commutation element (42) to delay control by said commutation element of current to the winding, or windings after the theoretical commutation instant, and to disconnect current to the respective winding, or windings in advance of the respective turn-off commutation instant.

48. Motor according to claim 1, wherein the ferromagnetic means are dimensioned with respect to the current flowing through said coil, or coils to generate torque by stored magnetic energy ($M_{rel}$) which complements the torque derived from energy supplied to said coil or coils ($M_{el}$) and being effective during gaps of torque derived from said coil, or coils to add to an overall output torque which is substantially constant (graph 260, FIG. 23).

49. Motor according to claim 47, further comprising sensing means sensing voltages induced in said coil, or coils of the winding means upon rotation of the permanent magnets of the rotor past said coil or coils and providing sensed output signals having an a-c component; means phase-shifting the a-c component of said output signal and deriving a phase-shifted, derived signal ($u_{97}$); and means (FIG. 5; 100, 101, 102, 84) controlling said energization means to apply current to said coil or coils as a function of the value of said phase shifted derived signal.

50. Motor according to claim 49, wherein said means for obtaining a derived voltage includes phase-shift means phase-shifting the a-c component of said output signal by about 180°.

51. Motor according to claim 50, wherein said phase-shift means comprises a multi-stage filter (85).

52. Motor according to claim 51, wherein the filter (85) comprises at least two series connected R-C circuits.

53. Motor according to claim 49, further comprising reference means (95) to provide a comparison reference for said phase-shifted derived signal with respect to the reference.

54. Motor according to claim 49, further comprising a control amplifier (100, 84) and a filter network (85) connected to the control amplifier forming the phase shift means, said filter generating said derived voltage.

55. Motor according to claim 49, wherein said speed control circuit comprises a temperature sensitive element (87) having the characteristics to compensate for change of the remanent induction of the permanent magnetic rotor with respect to temperature.

56. Motor according to claim 49, wherein the volume of active ferromagnetic means increases within a first angular range ($\alpha$) and decreases within a second angular range ($\beta$), said angular ranges being measured with respect to the direction of rotation of the motor, said second angular range ($\beta$) being wider than said first angular range ($\alpha$).

57. Motor according to claim 2 wherein said first and second angular ranges are sequentially arranged on the stator.

58. Axial airgap, brushless d-c motor comprising
a stator comprising winding means including at least one flat coil extending transversely to the axis of the motor;
a permanent magnet rotor journalled and located such that its magnetic field interacts with the electromagnetic field of the stator coil or coils;
semiconductor means connected to and controlling current flow through the winding means;
transducer means responsive to position of the permanent magnet rotor and connected to control via said semiconductor means for alternately switching on and off current flow through said winding means as a function of rotor position to produce in operation an alternating electromagnetic field and to cause a driving torque to be applied to the rotor, said driving torque being interrupted during gaps of energization of said winding means;
ferromagnetic means having soft iron characteristics located on the stator within the magnetic field of the permanent magnet rotor and generating during operation of said motor an additional driving torque effective during the gaps of generation of driving torque due to the gaps in energization of the stator;
said transducer means being adapted for energizing said winding means when said rotor is in a starting position caused by interaction of said soft-iron ferromagnetic means with the field from the permanent magnet rotor and when electric energy is applied to the motor.

59. Motor according to claim 58, wherein the transducer means comprises a Hall generator located within the magnetic field of said permanent magnet rotor.

60. Motor according to claim 58, further comprising switching means sensing voltages induced in the winding means upon rotation of the rotor passed said winding means;
means phase-shifting the a-c component of said sensed voltage and deriving a phase-shifted derived signal;
and means controlling the application of current to said winding means as a function of the value of said phase-shifted derived signal.

61. Motor according to claim 58, wherein the ferromagnetic means comprises material of soft iron characteristic present in increasing volume through a first angular range and of decreasing volume through a second angular range, said first and second angular ranges being sequentially arranged on the stator, in the direction of rotation of the rotor.

62. Axial airgap, brushless d-c motor comprising
a stator having winding means including at least one flat coil extending transversely to the axis of the motor;
a permanent magnet rotor journalled and located such that its magnetic field interacts with the electrodynamic field of the winding means;
means sensing rotor position with respect to said stator winding means;
controlled switching means intermittently, periodically energizing said winding means;
said controlled switching means being connected to and controlled by said rotor position sensing means to energize said winding means to cause, in operation, a driving torque to be applied to the rotor, which driving torque ($M_{el}$) is periodically interrupted during gaps of energization of said winding means, said periodically interrupted driving torque being composed, according to rules of Fourier analysis, of a constant driving torque component and an alternating torque component superimposed on said constant driving torque component;

and ferromagnetic means having soft iron characteristics located on the stator and in magnetic circuit relationship with the permanent magnetic rotor and generating, in operation, an additional alternating torque ($M_{rel}$) operative substantially in counter phase to said alternating torque component so as to provide a positive driving torque substantially effective during the gaps of energization of said winding means.

63. Motor according to claim 62, wherein said ferromagnetic means are so shaped and located on the stator with respect to said winding means that, interaction of said ferromagnetic means with the magnetic field of the rotor generates a magnetic reluctance torque which, upon rotation of the rotor, is approximately a mirror image of the alternating component of the electrodynamic torque generated upon energization of the winding.

64. Motor according to claim 62, wherein the ferromagnetic means are located on the stator in a first angular range ($\alpha$) which causes a decrease of the magnetic reluctance of the magnetic circuit including the poles of the rotor and said ferromagnetic means, and which effect an increase in the magnetic reluctance in a second angular range ($\beta$).

65. Motor according to claim 62, wherein the rotor magnet is trapezoidally magnetized and provides a substantially constant magnetic field, between pole gaps, in an angular range between 90° el and less than 180° el.

* * * * *